United States Patent Office 3,304,301
Patented Feb. 14, 1967

3,304,301
DERIVATIVES OF 6-AMINOPENICILLANIC ACID
Hubert Vanderhaeghe, Kessel-lo, and Michel Claesen, Heverlee, Belgium, assignors to Recherche et Industrie Therapeutiques R.I.T., Genval, Belgium, a corporation of Belgium
No Drawing. Filed Dec. 24, 1963, Ser. No. 333,186
Claims priority, application Great Britain, Dec. 27, 1962, 48,696/62; Feb. 25, 1963, 7,473/63
6 Claims. (Cl. 260—239.1)

This invention relates to novel semi-synthetic antibiotic agents derived from 6-aminopenicillanic acid and presenting valuable antibacterial activity.

More specifically, the novel compounds of this invention may be represented by the following structural Formula I

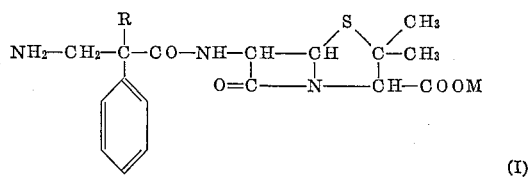

(I)

wherein:
R represents an alkyl, aryl or arylalkyl radical, and
M represents hydrogen or a pharmaceutically acceptable cation; said alkyl radicals having a maximum of 8 carbon atoms preferably 1 to 4 carbon atoms; said aryl radicals being preferably phenyl, thienyl or furyl.

Compounds of this invention not only present potent antibiotic activity against both Gram positive and Gram negative bacteria but also exhibit strong resistance to destruction in acidic media and are effective against benzylpenicillin resistant strains of Gram positive bacteria.

Therefore, the new synthetic compounds of our invention are of particular value in the treatment of infectious diseases caused in man and animals by either resistant Gram positive or Gram negative bacteria; they may also advantageously be used as nutritional supplements in animal feeds. While more preferably administered via the oral route, our compounds are also suitable for injection or topical application. They may be administered in any of the usual pharmaceutical forms well-known to the art such as tablets, capsules, powders, suspensions, solutions, suppositories, ointments and the like.

Also embraced by the present invention are the pharmaceutically acceptable salts of the above compounds. Thus, in addition to those compounds wherein M is hydrogen are for instance those wherein this atom is replaced by the cationic form of sodium, potassium, calcium, aluminium, or organic amine such as lower alkyl amine, e.g., triethylamine, as well as procaine, chloroprocaine, N,N'-dibenzylethylenediamine, N,N'-bis-(dehydroabietyl)-ethylenediamine, N-methyl-1,2 - diphenyl-2-hydroxy-ethylamine and the like.

The products of the general Formula I are preferably prepared by intermediate formation of the corresponding compound of the following general Formula II

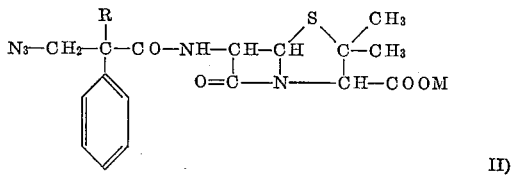

(II)

wherein R and M are as hereinabove defined.

These azido derivatives are novel compounds which possess antibacterial activity and are comprised in the scope of this invention. By hydrogenation under sufficiently mild conditions to avoid destruction of the penicillin nucleus, they are converted into the corresponding amino derivative of the above general Formula I.

According to this invention, the above azido derivatives of the general Formula II are preferably prepared by treating 6-aminopenicillanic acid with an acylating agent containing the appropriate

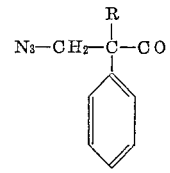

group wherein R is as hereabove defined.

The said acylating agent is for instance an halide, the anhydride or a mixed anhydride of the corresponding azido carboxylic acid; the mixed anhydride may be for instance a mixed anhydride of said azido carboxylic acid with another carboxylic acid or with a monoester of carbonic acid.

Although the products of general Formula I are preferably prepared via the compounds of Formula II, they also may be prepared according to any of the hereafter summarized procedures A and B.

A. Interaction of a reactive derivative of a carboxylic acid of the formula

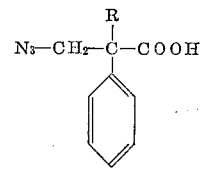

(wherein R is as above defined), either with a silyl derivative of 6-aminopenicillanic acid, as for instance

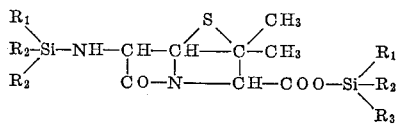

(wherein $R_1$, $R_2$ and $R_3$ are alkyl, aryl or arylalkyl radicals as defined above), or with a reaction product of 6-aminopenicillanic acid with a silylation agent, said interaction being followed by solvolyse of the silyl groups.

B. Interaction of an anhydride of the formula

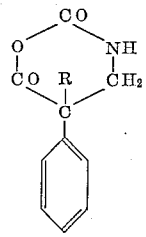

with an alkali metal salt of 6-aminopenicillanic acid.

In the above Formulae I and II when R is not phenyl, the carbon atom linked to R is an asymmetric carbon atom and the corresponding compounds can then exist in two optically active isomeric forms (epimers with "D" and "L" configuration in the side chain) as well as in the "DL" form.

These epimers may be obtained either by using optically active starting material or by optical resolution of the DL form according to procedures well-known to the art.

It is understood that the term "aryl" includes phenyl, thienyl or furyl radicals optically substituted by inert substitutents as known to the art such as halo, methoxy, ethoxy, methyl, ethyl, etc.

The following examples will serve to illustrate the present invention; they do not constitute a limitation thereof.

*Example 1*

6-aminopenicillanic acid (1.7 g.) is dissolved in a mixture of 21 ml. of molar aqueous solution of potassium bicarbonate and 10 ml. of acetone. The resultant solution is cooled in an ice-water bath and there is added dropwise with stirring a solution of 2.1 g. of 2-phenyl-2-azidomethyl-butyryl chloride in 6 ml. of acetone. Upon completion of the addition, the reaction medium is stirred for 10 minutes at the ice-water bath temperature and for two hours at room temperature. The medium is then purified by extraction with three portions of 20 ml. of butyl acetate which simultaneously eliminates the acetone.

The cold solution is then adjusted to pH 2.5 with 10% phosphoric acid and extracted with 25 ml. of butyl acetate and again with 5 ml. of butyl acetate.

The combined butyl acetate extracts are successively washed with water and re-extracted at pH 6.5 with aqueous sodium hydroxide solution. The aqueous layer is washed twice with ether and the remaining organic solvent is then removed by evaporation under reduced pressure.

The aqueous solution is lyophilized to give the sodium salt of 1-phenyl-1-azidomethyl-propyl-penicillin. Purity of this product (iodometric assay) is 100%; its stability after two hours at pH 2 is 50%.

The hereabove employed 2 - phenyl - 2 - azidomethyl-butylryl chloride can be prepared by reaction of thionyl chloride and 2-phenyl-2-azidomethyl-butyric acid. Said 2-phenyl-2-azidomethyl-butyric acid is prepared as follows; 2.57 g. of 2-phenyl-2-bromomethyl-butyric acid [prepared according to B. J. R. Nicolaus, L. Mariani and E. Testa, Helv. Chim. Acta, XLIV, 1076–1084 (1961)] is dissolved in 5 ml. of dry dimethylformamide. The solution is cooled in an ice-water bath and there is added with stirring a solution of 0.56 g. of potassium hydroxide in 0.65 ml. of water and then 1.3 g. of sodium azide. The obtained suspension is stirred for six hours at 50° C. The reaction medium is then diluted with 25 ml. of water, adjusted to pH 7 with aqueous sodium hydroxide and extracted with ether which is discarded. The aqueous residue is acidified with hydrochloric acid and again extracted with ether. This organic extract is washed with water and dried over sodium sulfate. The solvent is then evaporated and the residue is crystallized from petroleum ether to give 2-phenyl-2-azidomethyl-butyric acid (M.P. 77–78° C.).

*Example 2*

Sodium salt of 1-phenyl-1-azidomethyl-propyl-penicillin (1 g.) prepared as described in Example 1 is dissolved in 10 ml. of water. The pH of the reaction mixture is adjusted to 4.65 by dropwise addition of 0.3 N hydrochloric acid and 700 mg. of 10% palladium-on-charcoal (50% water content) is added thereto.

Hydrogenolysis is then carried out in a Parr apparatus at room temperature for a period of 3 hours under an hydrogen pressure of 3 kg./cm.$^2$.

The medium is then adjusted to pH 6 and the catalyst is removed by filtration and washed with water. The collected aqueous residues are cooled in an ice-water bath, adjusted to pH 2.5 with diluted hydrochloric acid and purified by extraction with butyl acetate, the organic extract being discarded.

The aqueous solution is neutralized to pH 6.5 with aqueous sodium hydroxide and lyophilized to yield the sodium salt of 1-phenyl-1-aminomethyl-propyl-penicillin.

Stability of this product after two hours at pH 2 is 90%. Paper chromatography in the system ether equilibrated against 28% ammonium sulfate solution in water (Whatman No. 1 paper) reveals for this product one single spot remaining on the start when the single spot of the 1-phenyl-1-azidomethyl-propyl-penicillin migrates when placed in the same conditions.

*Example 3*

Using the technique described in Example 1 but replacing the 2.1 g. of 2-phenyl-2-azidomethyl-butyryl chloride by 2.35 g. of 2-phenyl-2-azido-methyl-isovaleryl chloride or by 2.45 g. of 2-phenyl-2-azidomethyl-caproyl chloride, the 1-phenyl-2-azidomethyl - isobutyl - penicillin (sodium salt) and the 1-phenyl-1-azidomethyl - pentyl - penicillin (sodium salt) are respectively obtained upon completion of the steps herein indicated.

Similarly, the 2-phenyl-2-amidomethyl-isovaleryl chloride and the 2-phenyl-2-azidomethyl-caproyl chloride hereabove employed as starting materials are easily prepared from the corresponding 2-phenyl - 2 - bromomethyl-isovaleric acid and 2-phenyl-2-bromomethylcaproic acid.

*Example 4*

Using the technique described in Example 2 but replacing the 1 g. of 1-phenyl-1-azidomethyl - propyl - penicillin (sodium salt) by 1 g. of 1-phenyl-1-azidomethyl-isobutyl-penicillin (sodium salt) or 1 g. of 1-phenyl - 1 - azidomethyl-pentyl-penicillin (sodium salt) obtained in Example 3, the 1-phenyl-1-aminomethyl - isobutyl-penicillin (sodium salt) and the 1-phenyl-1-aminomethyl - pentyl-penicillin (sodium salt) are respectively obtained upon completion of the steps therein indicated.

Stability of both products after two hours at pH 2 is about 80%.

*Example 5*

6-aminopenicillanic acid (2.16 g.) is dissolved in a mixture of 27 ml. of molar aqueous solution of potassium bicarbonate and 12 ml. of acetone. The resultant solution is cooled in an ice-water bath and there is added dropwise with stirring a solution of 3.4 g. of 2,2-diphenyl-2-azidomethyl-acetyl chloride in 10 ml. of dioxane. Upon completion of the addition, the reaction medium is stirred for 10 minutes at the ice-water bath temperature and for two hours at room temperature.

The medium is then purified by extraction with three portions of 20 ml. of butyl acetate which is then discarded.

The cold solution is then adjusted to pH 2.5 with 10% phosphoric acid and extracted with 30 ml. of butyl acetate and again with 5 ml. of butyl acetate.

The combined butyl acetate extracts are successively washed with water and re-extracted at pH 6.5 with aqueous sodium hydroxide solution. The aqueous layer is washed twice with ether and the remaining organic solvent is then removed by evaporation under reduced pressure.

The aqueous solution is lyophilized to give the sodium salt of alpha-phenyl-alpha-azidomethyl-benzyl penicillin.

The hereabove employed 2,2-diphenyl-2-azidomethyl-acetyl chloride can be prepared from 2,2-diphenyl-2-azidomethyl-acetic acid. The 2,2-diphenyl-2-azidomethyl-acetic acid is prepared as follows: 6.1 g. of 2,2-diphenyl-2-bromomethyl-acetic acid [prepared according to B.J.R. Nicolaus, L. Mariani and E. Testa, Helv. Chim. Acta, XLIV, 1076–1084 (1961)] is dissolved in 10 ml. of dry dimethylformamide. The solution is cooled in an ice-water bath and there is added with stirring a solution of 1.12 g. of potassium hydroxide in 1.3 ml. of water and then 2.6 g. of sodium azide. The obtained suspension is stirred for six hours at 50° C. The reaction medium is then diluted with 50 ml. of water, adjusted to pH 7 with aqueous sodium hydroxide and extracted with ether which is discarded. The aqueous residue is acidified with hydrochloric acid and again extracted with ether. This organic extract is washed with water and dried over sodium sulfate. The solvent is then evaporated and the residue is reacted with thionyl chloride to give 2,2-diphenyl-2-azidomethyl acetyl chloride.

Example 6

Sodium salt of alpha-phenyl-alpha-azidomethyl-benzyl-penicillin (1 g.) prepared as described in Example 5, is dissolved in 15 ml. of water. The pH of the reaction mixture is adjusted to 5 by dropwise addition of 0.3 N hydrochloric acid, 700 mg. of 10% palladium-on-charcoal (50% water content) is added thereto.

Hydrogenolysis is then carried out in a Parr apparatus at room temperature for a period of 3 hours under an hydrogen pressure of 2 kg./cm.$^2$.

The medium is then adjusted to pH 6.1 and the catalyst is removed by filtration and washed with water. The collected aqueous residues are cooled in an ice-water bath, adjusted to pH 2.5 with diluted hydrochloric acid and purified by extraction with butyl acetate, the organic extract being discarded.

The aqueous solution is neutralized to pH 6.5 with aqueous sodium hydroxide and lyophilized to yield the sodium salt of alpha-phenyl-alpha-aminomethyl-benzyl penicillin.

Stability of this product after two hours at pH 2 is 85%.

Example 7

6-aminopenicillanic acid (3.4 g.) is dissolved in a mixture of 42 ml. of molar aqueous solution of potassium bicarbonate and 20 ml. of acetone. The resultant solution is cooled in an ice-water bath and there is added dropwise with stirring a solution of 5.3 g. of 3-phenyl-2-phenyl-2-azidomethyl propionyl chloride in 25 ml. of dioxane. Upon completion of the addition, the reaction medium is stirred for 10 minutes at the ice-water bath temperature and for two hours at room temperature. The medium is then purified by extraction with three portions of 30 ml. of butyl acetate which is discarded.

The cold solution is then adjusted to pH 2.5 with 10% sulfuric acid and extracted with 50 ml. of butyl acetate and again with 10 ml. of butyl acetate.

The combined butyl acetate extracts are successively washed with water and re-extracted at pH 6.5 with aqueous potassium hydroxide solution. The aqueous layer is washed twice with ether and the remaining organic solvent is then removed by evaporation under reduced pressure.

The aqueous solution is lyophilized to give the potassium salt of 1-phenyl-1-azidomethyl-2-phenyl-ethyl-penicillin.

The hereabove employed 3-phenyl-2-phenyl-2-azidomethylpropionyl chloride can be prepared from 3-phenyl-2-phenyl-2-azidomethyl-propionic acid. The 3-phenyl-2-phenyl-2-azidomethyl-propionic acid is prepared as follows: 6.4 g. of 3-phenyl-2-phenyl-2-bromomethyl-propionic acid [prepared according to B.J.R. Nicolaus, L. Mariani and E. Testa, Helv. Chim. Acta, XLIV, 1076–1084 (1961)] is dissolved in 15 ml. of dry dimethylformamide. The solution is cooled in an ice-water bath and there is added with stirring a solution of 1.2 g. of potassium hydroxide in 1.3 ml. of water and then 2.6 g. of sodium azide. The obtained suspension is stirred for six hours at 50° C. The reaction medium is then diluted with 50 ml. of water, adjusted to pH 7 with aqueous sodium hydroxide and extracted with ether which is discarded. The aqueous residue is acidified with hydrochloric acid and again extracted with ether. This organic extract is washed with water and dried over sodium sulfate. The solvent is then evaporated and the residue is reacted with thionyl chloride to give 3-phenyl-2-phenyl-2-azidomethyl-propionyl chloride.

Example 8

Potassium salt of 1 - phenyl-1-azidomethyl-2-phenyl-ethyl-penicillin (1.5 g.) prepared as described in Example 7 is dissolved in 15 ml. of water. The pH of the reaction mixture is adjusted to 5.2 by dropwise addition of 0.3 N hydrochloric acid and 500 mg. of 10% palladium-on-charcoal is added thereto.

Hydrogenolysis is then carried out in a Parr apparatus at room temperature for a period of 3 hours under a hydrogen pressure of 2.5 kg./cm.$^2$.

The medium is then adjusted to pH 6.5 and the catalyst is removed by filtration and washed with water.

The collected aqueous residues are cooled in an ice-water bath, adjusted to pH 2.5 with diluted hydrochloric acid and purified by extraction with butyl acetate, the organic extract being discarded.

The aqueous solution is neutralized to pH 6.5 with aqueous sodium hydroxide and lyophilized to yield the potassium salt of 1-phenyl-1-aminomethyl-2-phenyl-ethyl-penicillin.

Stability of this product after two hours at pH 2 is 80%.

What is claimed is:

1. A 6-aminopenicillanic acid derivative of the formula:

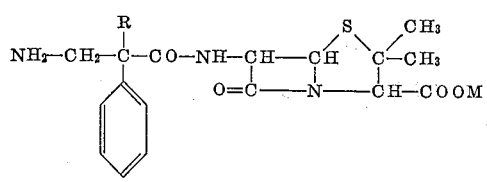

in which:

R is a member selected from the group consisting of aryl and arylalkyl and

M is a member selected from the group consisting of hydrogen and a pharmaceutically acceptable cation, said aryl being a member selected from the group consisting of phenyl, thienyl and furyl.

2. A compound of the formula:

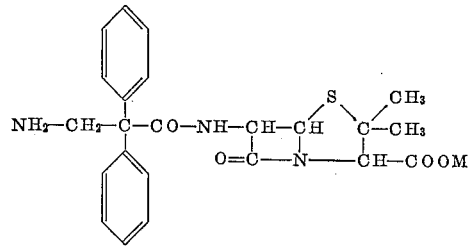

in which M is a pharmaceutically acceptable cation.

3. A compound of the formula:

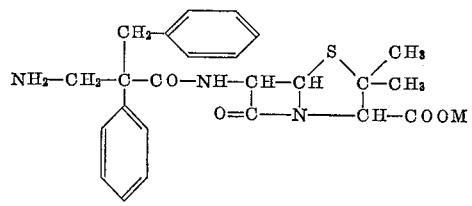

in which M is a pharmaceutically acceptable cation.

4. A 6-aminopenicillanic acid derivative of the formula:

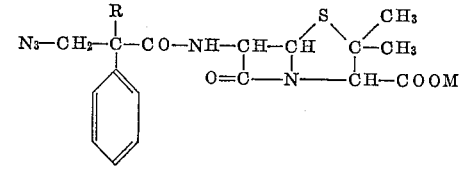

in which:

R is a member selected from the group consisting of aryl and arylalkyl and

M is a member selected from the group consisting of hydrogen and a pharmaceutically acceptable cation, said aryl being a member selected from the group consisting of phenyl, thienyl and furyl.

5. A compound of the formula:

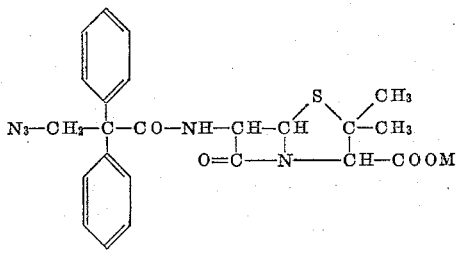

in which M is a pharmaceutically acceptable cation.

6. A compound of the formula:

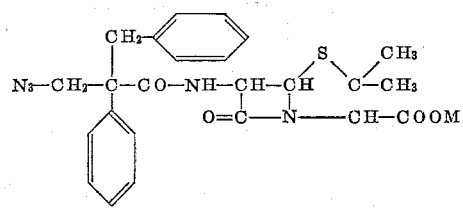

in which M is a pharmaceutically acceptable cation.

References Cited by the Examiner

UNITED STATES PATENTS

| | | |
|---|---|---|
| 3,120,514 | 2/1964 | Doyle et al. _____ 260—239.1 |
| 3,142,673 | 7/1964 | Hobbs _____ 260—239.1 |
| 3,161,634 | 12/1964 | Andersen _____ 260—239.1 |
| 3,174,964 | 3/1965 | Hobbs et al. _____ 260—239.1 |
| 3,228,930 | 1/1966 | Sjoberg et al. _____ 260—239.1 |
| 3,230,214 | 1/1966 | Fosker et al. _____ 260—239.1 |
| 3,245,983 | 4/1966 | Doyle et al. _____ 260—239.1 |
| 3,245,984 | 4/1966 | Testa et al. _____ 260—239.1 |

NICHOLAS S. RIZZO, *Primary Examiner.*

ALEX MAZEL, *Examiner.*

JAMES W. ADAMS, *Assistant Examiner.*